United States Patent [19]

Uratani

[11] Patent Number: 5,317,430
[45] Date of Patent: May 31, 1994

[54] LIQUID CRYSTAL DISPLAY DEVICE HAVING TRANSPARENT OPTICAL CONDUCTOR INTEGRAL WITH OPAQUE SUPPORT ON END SURFACES WITH NO LIGHT SOURCE

[75] Inventor: Shinichi Uratani, Osaka, Japan

[73] Assignee: Sharp Kabushiki Kaisha, Osaka, Japan

[21] Appl. No.: 987,621

[22] Filed: Dec. 9, 1992

[30] Foreign Application Priority Data

Dec. 11, 1991 [JP] Japan .................. 3-102132

[51] Int. Cl.$^5$ ............................. G02F 1/1335
[52] U.S. Cl. .............................. 359/49; 359/50
[58] Field of Search ............... 359/49, 50, 48; 362/31, 362/223

[56] References Cited

U.S. PATENT DOCUMENTS

| | | | |
|---|---|---|---|
| 3,864,905 | 2/1975 | Richardson | 359/49 |
| 4,011,001 | 3/1977 | Moriyaua | 359/49 |
| 4,118,111 | 10/1978 | Laesser | 359/49 |
| 4,618,216 | 10/1986 | Suzawa | 359/49 |
| 4,860,171 | 8/1989 | Kojima | 362/31 |
| 4,909,604 | 3/1990 | Kobayashi et al. | 359/49 |
| 5,046,826 | 9/1991 | Iwamoto et al. | 359/49 |
| 5,146,354 | 9/1992 | Plesinger | 359/49 |
| 5,161,873 | 11/1992 | Obata | 362/31 |

FOREIGN PATENT DOCUMENTS 0355064 2/1990 European Pat. Off. .
64-000987 1/1989 Japan .
3-171009 7/1991 Japan .

*Primary Examiner*—Anita P. Gross
*Attorney, Agent, or Firm*—David G. Conlin; Robert F. O'Connell

[57] ABSTRACT

A transparent optical conductor is disposed rearwardly of a liquid crystal device panel and an opaque support is formed integrally with the transparent optical conductor so as to merge into end surfaces thereof where no tubular light source is disposed. The opaque support and transparent optical conductor need not be disposed back to back in order to fix individual members of a liquid crystal display device.

3 Claims, 4 Drawing Sheets

LIQUID CRYSTAL DISPLAY DEVICE HAVING TRANSPARENT OPTICAL CONDUCTOR INTEGRAL WITH OPAQUE SUPPORT ON END SURFACES WITH NO LIGHT SOURCE

BACKGROUND OF THE INVENTION

1. Field of the Invention

The present invention relates to personal computers and more particularly to a liquid crystal display device for use in a laptop type personal computer which is so compact and lightweight that it can be carried on lap and which has performance comparable to that of disctop type computers, a word processor or a notebook type personal computer.

2. Prior Art

In the past, a liquid crystal display device having the following construction has been known as this type of liquid crystal display device.

(1) As will be described with reference to FIGS. 1 to 3, the known device comprises a liquid crystal device panel 1 and a lighting unit 12 for backlighting of the liquid crystal device panel 1.

The lighting unit 12 includes a transparent optical conductor 4 disposed in parallel with the liquid crystal device panel 1 rearwardly thereof, an opaque support 6 for supporting the transparent optical conductor 4 at a predetermined position relative to the liquid crystal device panel 1, a tubular light source 8 disposed near one end of the transparent optical conductor 4, and an opaque reflector 7 disposed laterally of the tubular light source 8 and adapted to reflect light, emitted from the tubular light source 8, toward the transparent optical conductor 4. A light diffusion sheet 3 is interposed between liquid crystal device panel 1 and transparent optical conductor 4 in order that light reflected from a reflector sheet 5 interposed between the opaque support 6 and transparent optical conductor 4 and light from the transparent optical conductor 4 can be diffused to illuminate the entire back surface of the liquid crystal device panel 1.

The liquid crystal device panel 1 is held, at its upper peripheral edge and sides, by a box-like outer frame 2. One end of the outer frame, remote from the tubular light source 8, terminates in a ⊐-letter shaped (in sectional form) recess in which a Z-shaped end of the opaque support 6 is inserted, and a liquid crystal control drive element 10 is surrounded by the liquid crystal device panel 1, Z-shaped end and ⊐-letter shaped recess.

A silicon cushion 9 is interposed between the light diffusion sheet 3 and one end of the liquid crystal device panel 1 so that even when impact hits the outer frame 2, the cushion 9 may absorb the impact to prevent the sheet 3 and panel 1 from being damaged (see FIG. 3).

(2) Another liquid crystal display device is also known having construction as shown in FIG. 4 wherein a transparent optical conductor 4 and a member corresponding to the aforementioned opaque support 6 are made of the same transparent material and formed integrally with each other or as a unitary structure, the support 6 has one reversed L-shaped end opposite to the other end at which a tubular light source is placed (see FIG. 2), which reversed L-shaped end is inserted in a ⊐-letter shaped recess of an outer frame 2, and a reflector sheet is provided on the bottom of the transparent optical conductor 4.

The reason why the outer frame 2 and opaque support 6 are formed as separate members in the conventional liquid crystal display device shown in FIGS. 1 to 3 is that when the liquid crystal device panel 1 and transparent optical conductor 4 conveyed from separate production lines are to be fixed back to back, it is more convenient from the standpoint of production process to separately produce the outer frame 2 for holding the liquid crystal device panel frontally thereof and the opaque support 6 for supporting the liquid crystal device panel rearwardly thereof and put them together upon assembling than to support the liquid crystal device panel and transparent optical conductor by using a single support member.

Further, the aforementioned transparent optical conductor 4, opaque support 6 and a combination light source cover and reflector 7 are members of different materials which are produced separately.

Further, in the conventional liquid crystal display device, the opaque support 6 and the combination light source cover and reflector 7 are separate members as best seen in FIG. 2 and in order to secure strength of each of the opaque support 6 and light source cover and reflector 7, both made of resin, their thicknesses must be increased. Under the circumstances, in the device shown in FIGS. 1 to 3 wherein the box-shaped opaque support 6 supports the back of the transparent optical conductor 4 to form a double layer structure of the transparent optical conductor 4 and opaque support 6, the device is increased in thickness in proportion to an increase in thickness of the opaque support 6 and cannot meet requirement of thickness reduction. Conceivably, with a view of reducing the thickness of the opaque support 6, the opaque support 6 may be made of extensible hard metal material but in this case a sheet metal treatment procedure is needed, complicating the working and besides the liquid crystal display device is increased in weight. In addition, reflecting power of an opaque support made of metal is smaller than that of the conventional opaque support of plastic material and optical loss at the end of the transparent optical conductor 4 increases. Even if metal paint treatment for reflection is applied at the cost of an additional painting process, the resulting reflecting power is still smaller than that of the resin material. Accordingly, the advent of a liquid crystal display device has been desired which uses an opaque support 6 made of a plastic material as in the conventional device and which can be reduced in thickness.

Further, as will be seen in FIG. 3, in the conventional liquid crystal display device, there is a gap 4a between one end of transparent optical conductor 4, where no tubular light source 8 is arranged, and the opaque support 6 and accordingly light within the transparent optical conductor 4 leaks to the gap 4a, causing an optical loss.

In the conventional liquid crystal display device shown in FIG. 4, the transparent optical conductor 4 and the (opaque) support 6 are made of the same material and formed integrally with each other to provide a support structure and hence light within a transparent optical conductor region of the support structure propagates also to a region of the support 6 which is clear of an effective display area L of liquid crystal device panel 1, with the result that light emitted from the tubular light source (see FIG. 2) cannot efficiently propagate and diffuse into the liquid crystal device panel 1, thus preventing high brightness capability.

SUMMARY OF THE INVENTION

The present invention contemplates elimination of the drawbacks of the aforementioned conventional liquid crystal display devices.

Thus, a first object of the invention is to provide a liquid crystal display device which can secure sufficient strength and which can be reduced in weight and thickness.

A second object of the invention is to provide a liquid crystal display device provided with a transparent optical conductor and an opaque support which can permit light emitted from a tubular light source to propagate to a liquid crystal device panel without suffering from loss.

A third object of the invention is to provide a liquid crystal display device which can be produced easily through a reduced number of production steps.

The above objects can be realized as follows. More particularly, a liquid crystal display device of the present invention comprises a liquid crystal device panel and a lighting unit for backlighting of the liquid crystal device panel, the lighting unit including a transparent optical conductor disposed in parallel with the liquid crystal device panel rearwardly thereof, an opaque support for supporting the transparent optical conductor in relation to the liquid crystal device panel, a tubular light source disposed at one end of the transparent optical conductor, and a light source cover and reflector disposed near the tubular light source and adapted to reflect light, emitted from the tubular light source and heading for the outside, toward the transparent optical conductor, wherein the opaque support is formed integrally with the transparent optical conductor so as to merge into the remaining end surfaces of the transparent optical conductor where no tubular light source is disposed, and the light source cover and reflector is formed integrally with the opaque support.

Thus, for fabrication of the liquid crystal display device of the invention, a transparent optical conductor is first shaped into a predetermined form and then an opaque support is formed integrally with the transparent optical conductor so as to merge into end surfaces thereof excepting one end where a tubular light source is placed. Subsequently, the tubular light source is inserted in the light source cover and reflector and thereafter a liquid crystal device panel is mounted, thereby completing fabrication of the liquid crystal display device.

Since the opaque support holds the transparent optical conductor through end surfaces thereof, the opaque support and transparent optical conductor need not be arranged back to back in order to materialize a structure for supporting individual members.

In operation, light emitted from the tubular light source propagates into the transparent optical conductor to back light the liquid crystal device panel. In this phase, light heading for end surfaces of the transparent optical conductor is reflected at the boundary between the transparent optical conductor and opaque support formed integrally therewith so as to illuminate the liquid crystal device panel highly efficiently.

DESCRIPTION OF THE PREFERRED EMBODIMENTS

Figure 1:
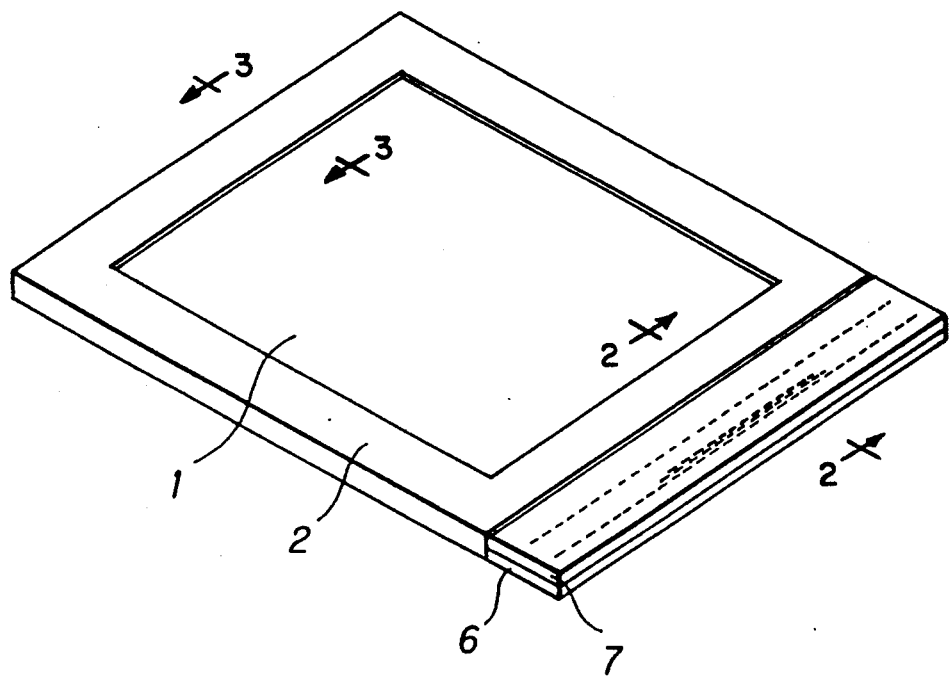
FIG. 1 is a perspective view showing the entire external appearance of a conventional liquid crystal display device.
Figure 2:
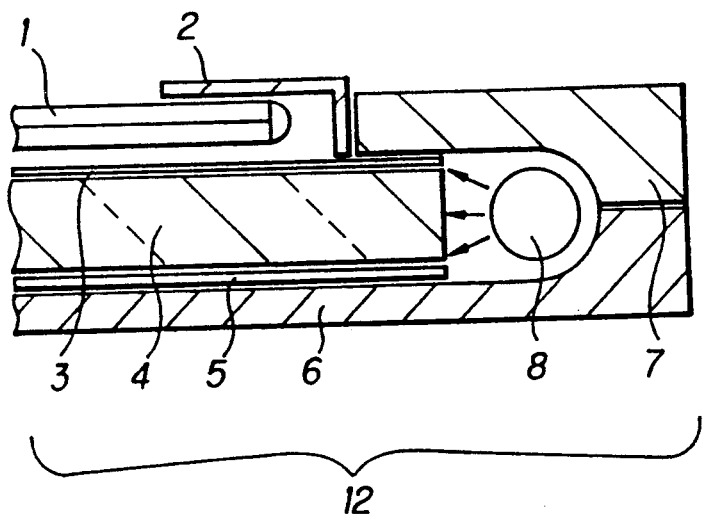
FIG. 2 is a fragmentary sectional view taken on the arrow line 2—2 of FIG. 1, showing a right-hand portion of FIG. 1.
Figure 3:
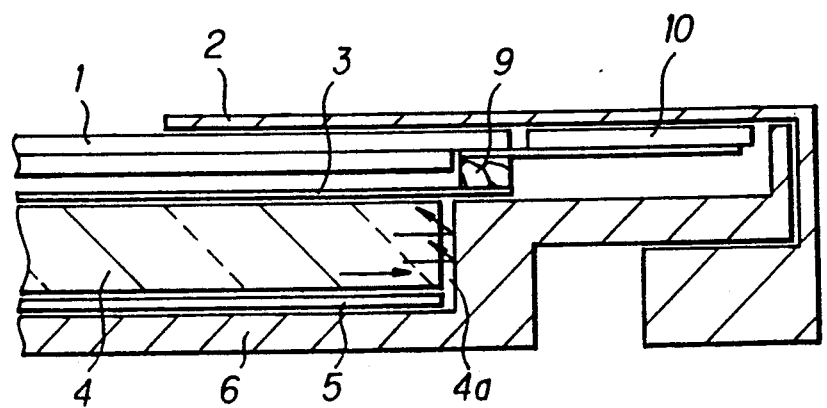
FIG. 3 is a fragmentary sectional view taken on the arrow line 3—3 of FIG. 1, showing a left-hand portion of FIG. 1.
Figure 4:
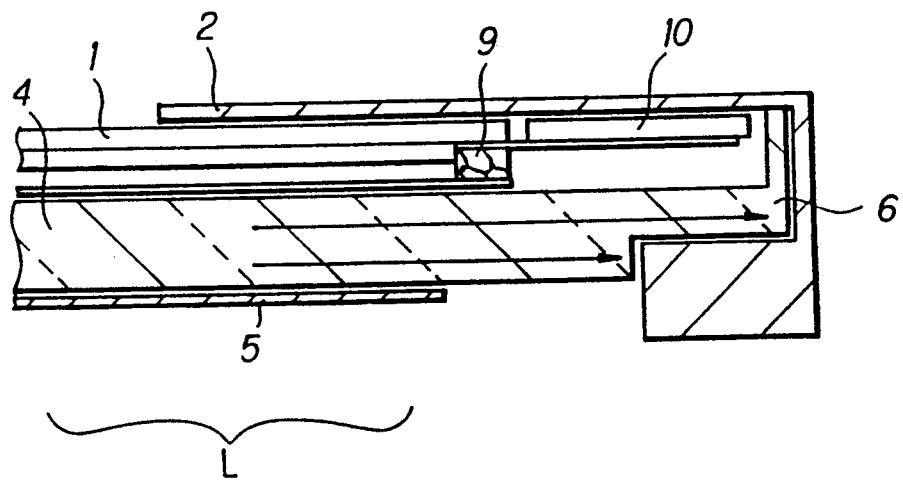
FIG. 4 is a fragmentary sectional view of another conventional liquid crystal display device, showing a portion thereof corresponding to FIG. 3.

Preferred embodiments of the invention will now be described. In the following description, members having the same function as that of those constituting the prior art liquid crystal display devices of the construction shown in FIGS. 1 to 3 and FIG. 4 will be assigned with the same reference numerals as those in the foregoing.

Figure 5:
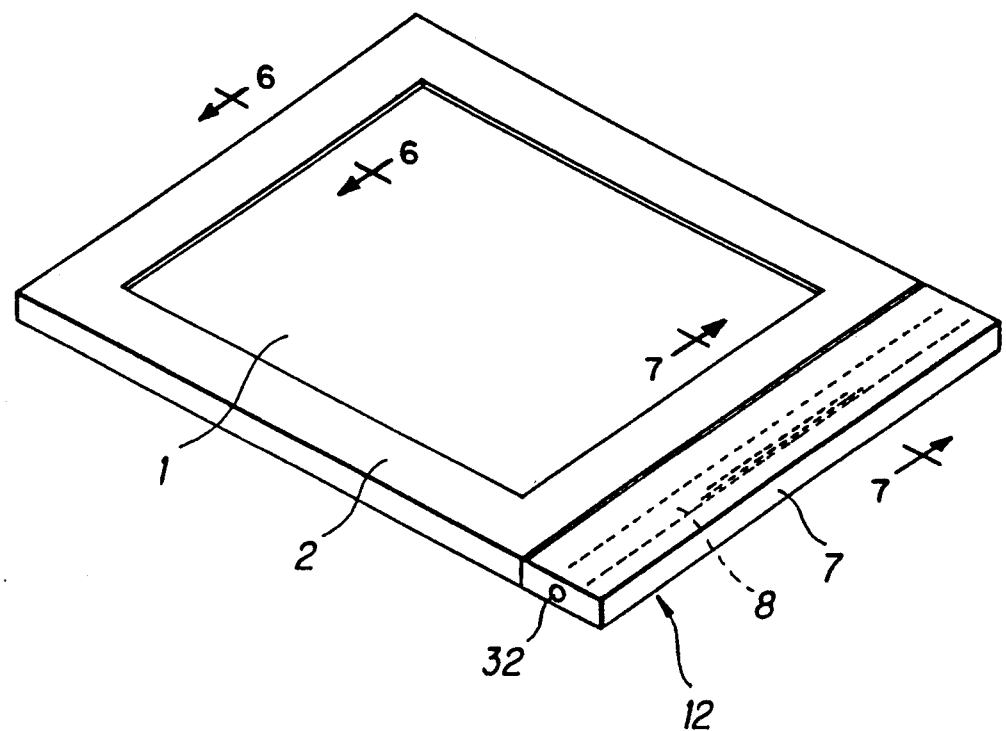
FIG. 5 is a perspective view showing the entire external appearance of a liquid crystal display device according to an embodiment of the invention.
Figure 6:
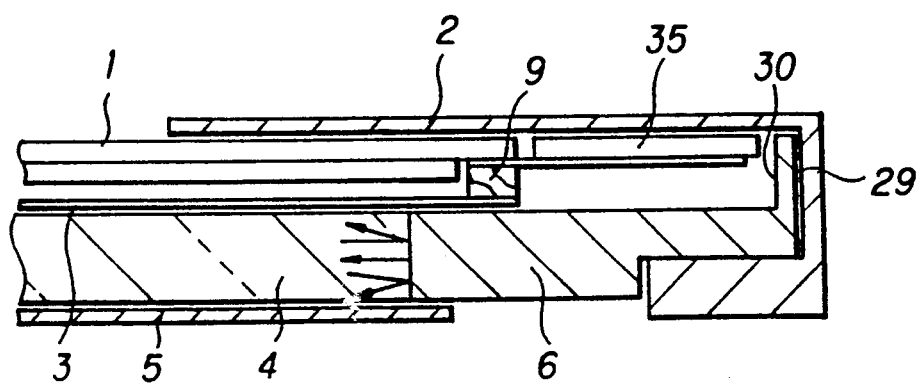
FIG. 6 is a fragmentary sectional view taken on the arrow line 6—6 of FIG. 5, showing a left-hand portion of FIG. 5.
Figure 7:
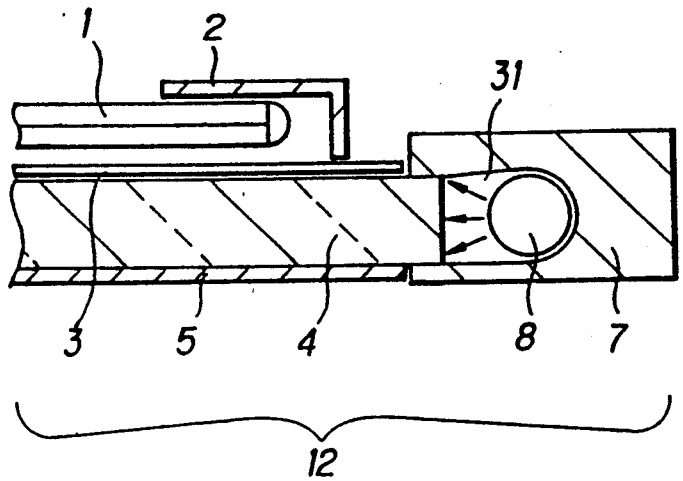
FIG. 7 is a fragmentary sectional view taken on the arrow line 7—7 of FIG. 5, showing a right-hand portion of FIG. 5.

FIG. 5 is a perspective view showing the external appearance of a liquid crystal display device according to an embodiment of the invention, FIG. 6 is a fragmentary sectional view taken on the arrow line 6—6 of FIG. 5, showing the side on which no tubular light source 8 is arranged, and FIG. 7 is a fragmentary sectional view taken on the arrow line 7—7 of FIG. 5, showing the side on which a tubular light source 8 is arranged.

As shown in the figures, the liquid crystal display device of the present embodiment comprises a liquid crystal device panel 1, a lighting unit 12 for backlighting of the liquid crystal device panel, and an outer frame with window 2 (metal bezel) for fixing the liquid crystal device panel 1 frontally of the lighting unit 12.

A common liquid crystal device panel having a plate-like form of 2.2 mm thickness is used as the liquid crystal device panel 1.

The lighting unit 12 includes a transparent optical conductor 4 disposed in parallel with the liquid crystal device panel 1 rearwardly thereof, a tubular light source 8 disposed at one end of the transparent optical conductor 4, an opaque support 6 having ends in the form of a -letter shape (plan view form) and adapted to support the transparent optical conductor 4 in relation to the outer frame with window 2, and a combination light source cover and reflector 7 disposed near the tubular light source 8 and adapted to reflect light, emitted from the tubular light source 8 and heading outwards, toward the transparent optical conductor 4.

As shown in FIGS. 6 and 7, the transparent optical conductor 4 is formed of a plate made of acryl resin, having a thickness of 1.8 mm and a length which is larger than one side of a display area of the liquid crystal device panel 1. The transparent optical conductor 4 has its rear surface to which a reflector sheet 5 adapted to reflect light, heading rearwards in the transparent optical conductor 4, toward the liquid crystal device panel 1 is bonded and its front surface to which a light diffusion sheet 3 is bonded. Each of the sheets 5 and 3 has a thickness of 0.1 mm.

Used as the tubular light source 8 is, for example, a linear cold cathode filament tube (CCFT) having a diameter of, for example, 3.0 mm.

The opaque support 6 as shown in FIG. 6 is made of an opaque plastic material of low thermal conductivity such as polycarbonate resin or ACS (acrylonitrile chlorinated polyethylene styrene) resin and as shown in FIG. 6, it is formed integrally with the transparent optical conductor 4 so as to merge into end surfaces thereof near which no tubular light source 8 is arranged, having a reversed L-shaped fitting end 30 which is inserted in a -letter shaped fitting recess 29 of the outer frame 2.

The combination light source cover and reflector 7 as shown in FIG. 7 has a receiving chamber 31 of a reversed C-shape sectional form for accommodating the tubular light source 8 and is made of the same material as the opaque support 6 so as to be formed integrally therewith.

The receiving chamber 31 of the combination light source cover and reflector 7 has a □-shaped plan view form as shown in FIG. 5 in order that the tubular light source 8 can be inserted in the chamber and an illuminating surface can be displayed frontally.

In FIG. 6, reference numeral 35 designates a drive circuit of the liquid crystal device panel 1 and 9a cushion spacer.

The liquid crystal display device of the present embodiment can be produced as follows.

Firstly, a plate-like transparent optical conductor 4 is injection-molded by using metal molds and thereafter integrated with an opaque support 6 at three end surfaces excepting one side end surface which makes room for a tubular light source 8, through injection molding using metal molds (two-color injection molding process).

Subsequently, a reflector sheet 5 is bonded to the rear surface of the transparent optical conductor 4 and a light diffusion sheet 3 is bonded to the front surface of the optical conductor 4. A cushion spacer 9 is then mounted to one end of the light diffusion sheet 3, a liquid crystal device panel 1 is placed on the cushion spacer, and an outer frame with window 2 is mounted in such a way that a window of the outer frame 2 lies above the liquid crystal device panel.

Finally, the tubular light source 8 is inserted in an insertion hole of a light source cover and reflector 7, thus completing a liquid crystal display device.

In the thus produced liquid crystal display device, the transparent optical conductor 4, opaque support 6 and a combination light source cover and reflector 7 are formed integrally with each other through molding using several kinds of different materials and therefore the support (for example, opaque support) needed in the conventional liquid crystal display devices for supporting the back of the transparent optical conductor 4 can be dispensed with and the device can be reduced in thickness.

Further, since leakage of light from the side surfaces of the transparent optical conductor 4 can be prevented, the transparent optical conductor 4 can be made of, for example, acryl resin of high light transmittivity (PMMA) and the support of the liquid crystal display device (opaque support 6) and light source cover and reflector 7 can be made of, for example, polycarbonate resin or ACS resin which has high reflecting power and high strength, thereby attaining high brightness performance.

It should be understood that the invention is in no way limited to the foregoing embodiment and many alternations and modifications thereof can be made within the framework of the technical teachings of the invention. For example, the opaque support 6 may be fixed to the outer frame 2 by means of screws.

While in the foregoing embodiment the lighting unit 12 of the liquid crystal display device is exemplified as having the transparent optical conductor 4, opaque support 6, tubular light source 8, light source cover and reflector 7, reflector sheet 7 and light diffusion sheet 3, it may be removed of the light diffusion sheet 3 and reflector sheet 5.

Figure 8:
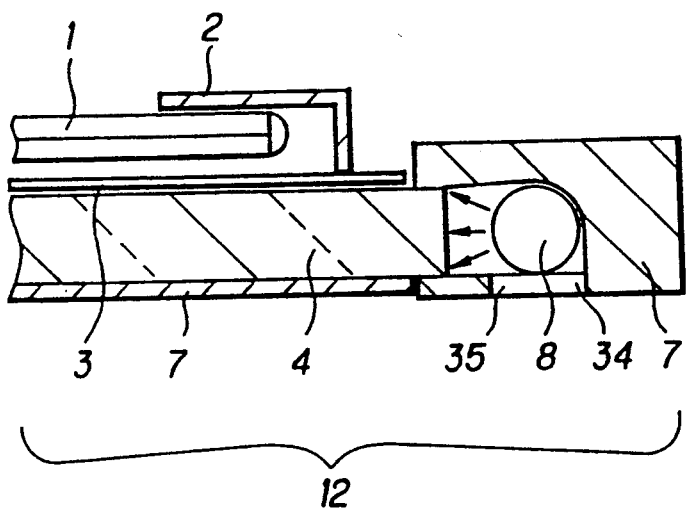
FIG. 8 is a fragmentary sectional view showing the construction of a light source cover and reflector in a liquid crystal display device according to another embodiment of the invention.

Further, in the foregoing embodiment, the tubular light source 8 is inserted in the combination light source cover and reflector 7 through an insertion hole 32 formed as shown in FIG. 5 but an opening 34 having the same length as the tubular light source 8 may be formed in the member 7 rearwardly or frontally of the light source 8 and after insertion of the light source, the opening 34 may be closed with a resin plate 35, as shown in FIG. 8.

As described above, since according to the invention the support is formed integrally with the optical conductor and the light source reflector is formed integrally with the support, such a support structure as in the first prior art wherein the support abuts against the back of the optical conductor to support it is not needed to permit the optical conductor and support to be constructed in a coplanar form, thereby reducing the thickness correspondingly. Accordingly, the liquid crystal display device can be reduced in thickness without resort to a support made of metal of low reflecting power.

What is claimed is:

1. A liquid crystal display device comprising a liquid crystal device panel and a lighting unit for backlighting of said liquid crystal device panel, said lighting unit including a transparent optical conductor disposed in parallel with said liquid crystal device panel rearwardly thereof, an opaque support for supporting said transparent optical conductor in relation to said liquid crystal device panel, a tubular light source disposed at one end of said transparent optical conductor, and a light source cover and reflector disposed near said tubular light source and adapted to reflect light, emitted from said tubular light source and heading for the outside, toward said transparent optical conductor, wherein said opaque support is formed integrally with said transparent optical conductor so as to merge into the remaining end surfaces of said transparent optical conductor where no tubular light source is disposed, and said light source cover and reflector is formed integrally with said opaque support.

2. A liquid crystal display device according to claim 1 wherein said transparent optical conductor is formed of a plate-like acryl resin material and said opaque support is formed of an opaque plastic material of low thermal conductivity.

3. A liquid crystal display device according to claim 2 wherein a light diffusion sheet is interposed between said transparent optical conductor and said liquid crystal device panel, and a reflector sheet is disposed on the back of said opaque support.

* * * * *